(12) United States Patent
Grohmann et al.

(10) Patent No.: US 8,398,808 B2
(45) Date of Patent: Mar. 19, 2013

(54) METHOD AND DEVICE FOR ATTACHING SEALING PROFILES

(75) Inventors: Klaus Grohmann, Hersdorf (DE); Lothar Thommes, Bitburg (DE); Martin Weinandy, Fleringen (DE)

(73) Assignee: Grohmann Engineering GmbH, Pruem (DE)

( * ) Notice: Subject to any disclaimer, the term of this patent is extended or adjusted under 35 U.S.C. 154(b) by 564 days.

(21) Appl. No.: 12/311,948

(22) PCT Filed: Feb. 7, 2008

(86) PCT No.: PCT/EP2008/000943
§ 371 (c)(1),
(2), (4) Date: Apr. 20, 2009

(87) PCT Pub. No.: WO2008/104269
PCT Pub. Date: Sep. 4, 2008

(65) Prior Publication Data
US 2010/0024976 A1    Feb. 4, 2010

(30) Foreign Application Priority Data
Mar. 1, 2007 (DE) .......................... 10 2007 010 421

(51) Int. Cl.
*B32B 37/00* (2006.01)
*B29C 65/00* (2006.01)

(52) U.S. Cl. ............... 156/308.2; 156/166; 156/249; 156/543; 156/574; 156/577

(58) Field of Classification Search .................. 156/157, 156/159, 502, 504, 574, 575, 577, 546, 578, 156/166, 199, 160, 324, 308.2, 247, 249, 156/391, 486, 494, 582, 543; 29/450, 451, 29/235
See application file for complete search history.

(56) References Cited

U.S. PATENT DOCUMENTS

| 4,100,012 A * | 7/1978 | Meihofer et al. ............. 156/351 |
| 4,620,354 A | 11/1986 | Hess et al. |
| 2001/0050133 A1 * | 12/2001 | Meguro .......................... 156/94 |
| 2004/0219356 A1 * | 11/2004 | Valdez .......................... 428/345 |
| 2005/0193544 A1 | 9/2005 | Supina et al. |

FOREIGN PATENT DOCUMENTS

| DE | 197 04 327 | 5/1998 |
| DE | 101 38 781 | 2/2003 |
| DE | 10342658 A1 * | 4/2005 |
| WO | WO2004/108459 | 12/2004 |

* cited by examiner

OTHER PUBLICATIONS

Machine translation of DE 19704327 date unknown.*
Machine translation of DE 10342658 date unknown.*
RD450063 Anonymous Oct. 2001.*

*Primary Examiner* — John Goff
(74) *Attorney, Agent, or Firm* — Lucas & Mercanti, LLP

(57) ABSTRACT

A method for attaching a sealing profile to a vehicle body part includes the steps of pulling the sealing profile from a storage unit; passing the sealing profile through a first buffer which compensates for differences between incoming and outgoing speeds of the sealing profile; attaching an adhesive strip to the sealing profile continuously, the adhesive strip having a first adhesive layer facing the sealing profile and a second adhesive layer facing away from the sealing profile; passing the sealing profile with the attached adhesive strip through a second buffer which compensates for differences between incoming and outgoing speeds of the sealing profile; and rolling the second adhesive layer onto the vehicle body part. The adhesive strip is attached to the sealing strip in an assembly unit which heats the first adhesive layer as it moves around a press roller.

16 Claims, 2 Drawing Sheets a)

b)

c)

d)

e)

METHOD AND DEVICE FOR ATTACHING SEALING PROFILES

CROSS-REFERENCE TO RELATED APPLICATIONS

This is a U.S. national stage of International Application No. PCT/EP2008/000943 filed on 7 Feb. 2008. Priority is claimed on German Application No. 10 2007 010 421.0, filed on 1 Mar. 2007.

BACKGROUND OF THE INVENTION

1. Field of the Invention

The invention pertains to a method for attaching sealing profiles to vehicle bodies or their parts, where the sealing profile is pulled from a storage unit, and a press roller is used to roll an adhesive layer carried on the sealing profile onto the vehicle body or a vehicle body part along a line provided for this attachment process.

2. Description of the Related Art

A method for attaching a seal to a vehicle door is known from DE 101 38 781 A1, in which the seal, in the form of an endless profile on a supply roll, is pulled from the supply roll, and an adhesive surface on the seal is rolled continuously around the vehicle door along a line provided for this attachment process.

In conjunction with this prior art and the present invention, the term "rolled onto" is intended to mean that the press rollers, for example, of a suitable application device are used to press the sealing profile continuously along a surface of a vehicle body or vehicle body part such as a vehicle door following a predefined installation line, the profile thus being attached in this manner.

The sealing profile in the process according to DE 101 38 781 A1 is in the form of an extruded profile to which an adhesive tape has been applied and which is wound up on a supply roll, from which it is pulled. The adhesive surface of the sealing profile is covered initially by a liner, which is pulled off before the seal is attached. The liner can be pulled from the adhesive surface by a robot, for example, which also carries the press roller.

The sealing profile wound up on the supply roll must be preassembled at the manufacturer's plant. It normally consists of the sealing profile and the adhesive strip applied to it, where the surface of the adhesive layer facing toward the outside is covered by the liner. The preassembly of the sealing profile, therefore, consists not only of the step of extruding the sealing profile but also the additionally required steps of gluing the adhesive strip to the sealing profile and of attaching the liner.

The attachment of the adhesive strip must be precisely coordinated with the extrusion process, which could otherwise be disturbed by this attachment step. In addition, it is necessary for the preassembled sealing profile to be to be packaged carefully for the trip from the manufacturer of the sealing profile to the user, such as an auto maker. Otherwise, there is the danger that the liner could separate prematurely from the adhesive layer, which would prevent the sealing profile from bonding properly to the vehicle body or vehicle body part. But even if the profile is properly packaged, there is still the danger that the liner can come loose during transport as a result of vibrations, internal stresses in the sealing profile, or the effects of weather. Bonding the adhesive strip to the profile during the extrusion process can also cause the quality of different lots of sealing profiles to vary.

Finally, a device for mounting a sealing strip on the flange of a sunroof opening or other opening in a car body is known from DE 197 04 327 C1, in which a supply roll is installed permanently in a storage unit structurally separate from the application device, and in which the sealing strip being paid out from the supply roll is buffered in a length buffer by means of at least one loop passing around two pulleys spaced a certain distance apart, this distance corresponding to the length required for the sunroof opening.

SUMMARY OF THE INVENTION

Proceeding from this prior art, the invention is based on the object of creating a method for attaching sealing profiles of the type indicated above, in which the previously described disadvantages arising from the assembly of the sealing profile are avoided or at least minimized.

The achievement of this object is based on the idea of integrating the assembly of the sealing profile in both time and space with the attachment of the sealing profile to the vehicle body or its parts.

This object is achieved specifically in a process of the type indicated above in that:

after the sealing profile has been pulled from the storage unit, it passes through a first buffer, which compensates for differences between the incoming and outgoing speeds of the sealing profile;

an adhesive strip comprising the adhesive layer is then attached to the sealing profile;

the sealing profile provided with the adhesive strip passes through a second buffer, which compensates for differences between the incoming and outgoing speeds of the sealing profile; and finally, the adhesive layer of the adhesive strip on the sealing profile is rolled onto the vehicle body or vehicle body part.

As a result of the inventive process, external influences such as weather conditions, vibrations, and internal stresses acting on the sealing profile are almost completely excluded, because the assembly of the sealing profile is integrated into the seal attachment process.

For the inventive process, an adhesive strip, preferably provided with an adhesive layer on both sides, is glued to the sealing profile. This first adhesive layer joins the adhesive strip to the sealing profile. The second adhesive layer joins the sealing profile provided with the adhesive strip to the vehicle body or vehicle body part.

The first adhesive layer of the adhesive strip preferably comprises a heat-activatable adhesive, whereas the second adhesive layer, which is provided on the opposite side of the adhesive strip, preferably comprises a pressure-activatable adhesive. The heat-activatable adhesive offers the advantage that the adhesive strip can be guided through the assembly unit of the device for implementing the process all the way to the press roller for the adhesive strip and only then activated by the controlled input of heat. To supply the heat, heating means are preferably installed at least upstream of the press roller (i.e., upstream with respect to the direction of movement of the sealing profile) to heat the sealing profile and thus to activate the heat-activatable adhesive adhering to the adhesive strip. In addition or as an alternative, heating means can be installed near the circumference of the press roller. These heating means are preferably located in the area of the segment of the press roller around which the adhesive strip is wrapped.

Because the adhesive strip passes through a buffer which compensates for differences between the incoming and outgoing speeds of the adhesive strip before the adhesive strip is rolled onto the sealing profile, the adhesive strip can be pulled continuously from different spools, where the adhesive strips from the different spools can be connected to each in an adhesive strip connector (also called a "splicer").

The liner does not have to be attached to the adhesive strip in the inventive process as long as the sealing profile provided with the adhesive strip is guided by guide elements all the way to the press roller in the application unit in such a way that the adhesive layer of the adhesive strip, i.e., the layer which cooperates with the car body or car body part, does not come in contact with the guide elements.

Because of the time required to swap out one vehicle body or its part to which the seals have been attached for another, the process of attaching the sealing profiles is not continuous. So that, in spite of this, the quality of the attachment of the adhesive strip to the sealing profile in the assembly unit can be kept uniformly high, it is necessary for the adhesive strip to be glued continuously to the sealing profile. In the inventive method, the continuous attachment of the adhesive strip to the sealing profile is guaranteed in that the sealing profile passes through a buffer before the assembly of the seal and then through another buffer after the assembly of the seal, these buffers compensating for differences between the incoming and outgoing speeds of the sealing profile. As a result, the assembly of the sealing profile is disconnected from the application of the assembled sealing profile to the vehicle body or vehicle body part within the scope of conventional product swap-out times. Only then when the application of the assembled sealing profile to the vehicle bodies or vehicle body parts being supplied continuously to the application unit is interrupted for a long period of time will it also be necessary to interrupt the assembly of the sealing profile.

The buffers used to achieve this disconnection are formed by, for example, several guide pulleys, the distance between which can be varied and over which the sealing profile and/or the adhesive strip is guided. The distance is changed preferably by means of an adjusting drive.

The assembly unit of the inventive device for implementing the method comprises a storage unit for the adhesive strip. The storage unit can consist in particular of supply spools, on which the adhesive strip is rolled up. In the interest of the previously mentioned continuous assembly of the sealing profile, the storage unit of the assembly unit preferably comprises at least two spools carrying the same type of adhesive strip, the adhesive strip being pulled first from the one, then from the other spool. Once the adhesive strip of the first spool is used up, its end is connected to the beginning of the adhesive strip on the second spool in an adhesive strip connector (also called an automatic splicer). A buffer is located between the adhesive strip connector and the press roller of the assembly unit to compensate for the fact that, during the process of connecting two strips together, the incoming adhesive strip travels more slowly, whereas the speed of the outgoing adhesive strip remains unchanged.

If the position of the press roller of the assembly unit can be adjusted toward the sealing profile, it is possible for the assembly unit to process sealing profiles of different types. The positioning function guarantees that the adhesive strip can be applied with uniform pressure to the sealing profile regardless of the cross section of the profile.

At least the application unit, but possibly also the other components of the device, can be mounted on the arm of a robot. Alternatively, there is the possibility that the device for implementing the method could be designed to be stationary, in which case a robot arm would move the car body or the car body part against the press roller of the application unit so that the roll travels along the intended application line.

In an advantageous embodiment of the invention, the application unit comprises a cutting device for the sealing profile, by means of which the profile, upon completion of the process of the application, can be cut off straight across.

To obtain uniform conditions for the assembly of the sealing profile, preferably the first buffer, the assembly unit, and the second buffer of the device are installed in a climate-controlled chamber. The climate-controlled chamber makes it possible in particular to keep the temperature, the humidity, and the air pressure constant.

DETAILED DESCRIPTION OF THE PREFERRED EMBODIMENTS

Figure 1:
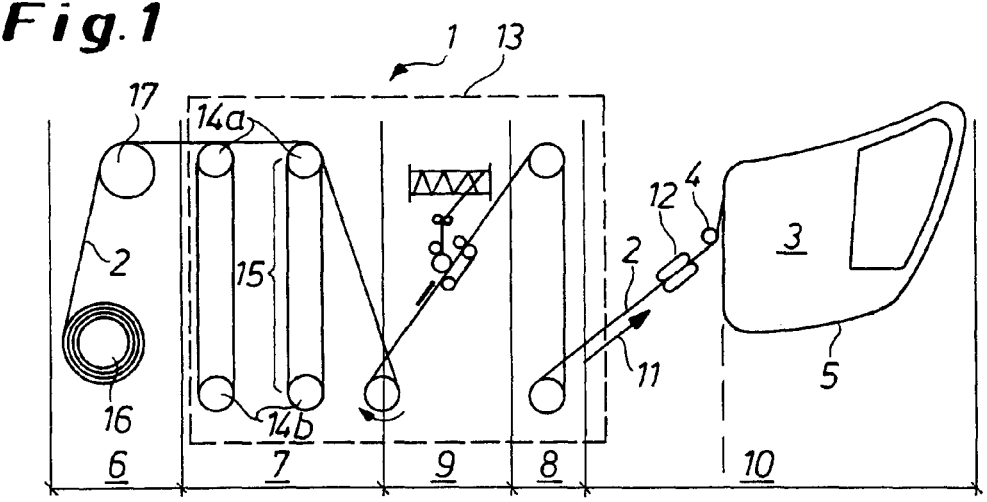
FIG. 1 shows a schematic diagram of a device for implementing the inventive method.

FIG. 1 shows a device, designated 1 overall, for attaching a sealing profile 2 to a vehicle door 3 by means of a press roller 4. In the exemplary embodiment shown here, the sealing profile 2 is attached to a surface 5, which extends up from the plane of the vehicle door 3 and thus from the plane of the drawing at more-or-less a right angle. The line provided on this surface for the attachment of the sealing profile 2 corresponds to the contour 5 of the schematically illustrated vehicle door.

In detail, the device includes a profile feeder 6, first and second buffers 7, 8, a assembly unit 9 located between the first and second buffers 7, 8, and the application unit 10. The application unit 10 includes the press roller 4 and guides 12 for the sealing profile installed upstream (with respect to the direction of movement of the profile) of the press roller. These guides 12 can, if needed, also be driven and thus push the sealing profile 2 toward the press roller 4. In the exemplary embodiment shown here, the application unit 10 is stationary. A robot arm (not shown) moves the vehicle door 3 in such a way that the line on the door along which the sealing profile is to be attached travels past the stationary press roller 4.

The two buffers 7, 8 and the assembly unit 9 are housed in a common climate-controlled chamber 13. Each of the buffers 7, 8 comprises several guide pulleys 14a, 14b, the distance between which can be adjusted. The distance 15 is changed by means of an adjusting drive (not shown) while the sealing profile 2 is passing around the guide pulleys 14a, 14b. The profile feeder 6 consists of a supply spool 16 as a storage unit for the sealing profile, which is wound up on the spool and consists purely of the extruded profile and thus does not carry an adhesive strip. Downstream of the supply spool 16 (i.e., downstream with respect to the direction of movement of the sealing profile 2), there is a driven guide pulley 17 to pull the sealing profile 2 from the supply spool 16.

Figure 3:
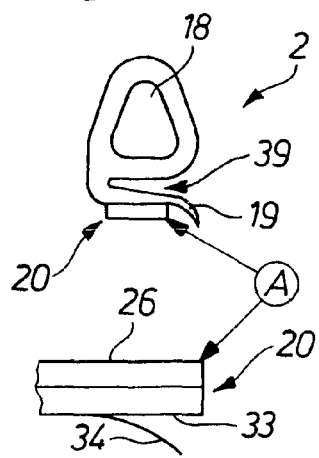
FIG. 3 shows a diagram of a sealing profile with an adhesive strip arranged on it.

The cross section of the sealing profile 2 wound up on the supply spool is shown in FIG. 3. The sealing profile 2 consists of a hollow profile 18, on which a lip 19 is arranged, to which, in the assembly unit 9, the adhesive strip 20 is attached just before the sealing profile 2 is attached to the vehicle door 3.

Figure 2:
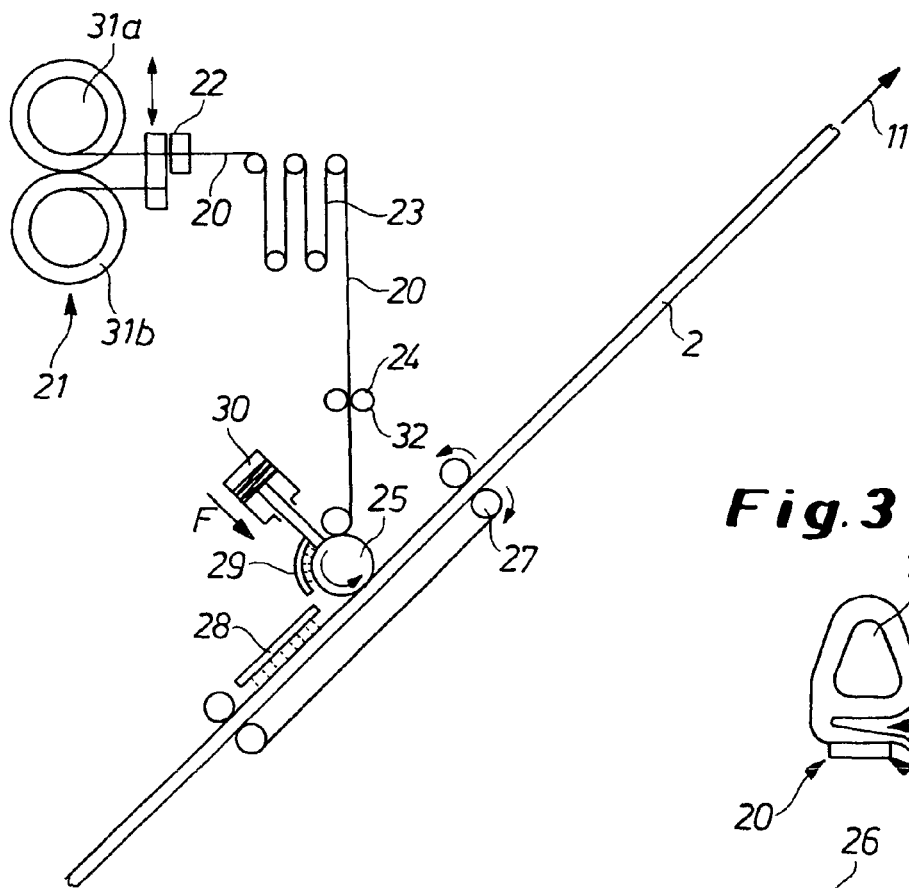
FIG. 2 shows a schematic diagram of a assembly unit of the device according to FIG. 1.

The adhesive strip 20 is attached to the sealing profile 2 in the assembly unit 9 shown in detail in FIG. 2. The assembly unit 9 consists essentially of a storage unit 21 for the adhesive strip 20, an adhesive strip connector 22, a buffer 23, a takeoff 24 for taking the adhesive strip from the storage unit 21, and a press roller 25, which deflects the adhesive strip 20 into the direction of movement 11 of the sealing profile 2 and presses the first adhesive layer 26, consisting of a heat-activatable adhesive, of the adhesive strip 20 against the sealing profile 2. Underneath the press roller 25, on the bottom side of the sealing profile 2, there is a support belt 27, the upper strand of which supports the sealing profile 2 against the force being applied by the press roller 25. The sealing profile is driven in the direction 11 by the belt in conjunction with two other drive rolls, which are located on the top side of the guide profile 2 at the level of the guide pulleys of the support belt 27.

Upstream of the press roller 25, i.e., upstream with respect to the direction of movement 11, a heater 28 is provided, which heats the profile 2 as it passes along underneath. Another heater 29 is installed near the circumference of the press roller 25 and heats the heat-activatable first adhesive layer 26. The force with which the adhesive strip 20 is pressed by the press roller 25 against the sealing profile 2 is supplied by a controlled positioner 30, acting in the direction perpendicular to the direction of movement 11.

The storage unit 21 of the assembly unit 9 includes two supply spools 31a, 31b, each carrying the same type of adhesive strip 20. The adhesive strip 20 is pulled first from the one supply spool 31a, then from the other spools 31b. Once the adhesive strip 20 of the supply spool 31a is used up, its trailing end is connected automatically to the leading end of the adhesive strip 20 on the supply spool 31b in the adhesive strip connector 22. The supply spool 31a is replaced by a new, full supply spool. The short period of time during which the takeoff of the adhesive strip is paused to allow the adhesive strips of the supply rolls 31a, 31b to be connected to each other in the automatic adhesive strip connector 22, is compensated in the buffer 23 by the shortening of the distance between the guide pulleys 14a, 14b so that the takeoff speed in the takeoff direction downstream of the buffer 23 remains constant. The takeoff 24, making use of the oppositely rotating takeoff rolls 32 acting on both sides of the adhesive strip 20, ensure that the takeoff speed remains uniform.

A second adhesive layer 33, which is formed in particular by a pressure-activatable adhesive, lies on the side of the adhesive strip 20 opposite the first, heat-activatable adhesive layer 26 of the adhesive strip 20. This second adhesive layer 33 is usually covered by a liner 34, as shown at the bottom of FIG. 3. Shortly before the second adhesive layer 33 of the sealing profile 2 is rolled along the line on the vehicle door, this liner 34 is removed from the adhesive strip, possibly by means of a guide pulley, and wound up on a spool.

With the inventive arrangement, however, it is also possible to eliminate the liner 34 completely, as long as the sealing profile 2 provided with the adhesive strip 20 is guided by means of drive and guide elements, especially drive rolls and deflectors, all the way to the press roller 4 in the application unit 10, in such a way that the second adhesive layer 33 with the pressure-activatable adhesive does not come in contact with the drive and guide elements. Especially after the adhesive strip 20 has been attached to the sealing profile 2, the sealing profile may be transported only in such a way that no contact occurs between the second adhesive layer 33 and the drive and guide elements.

Figure 4:
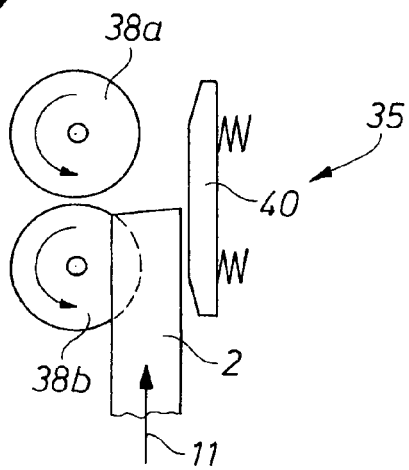
FIG. 4 shows various guide elements for the sealing profile and a cutting device for the sealing profile.
Figure 4:
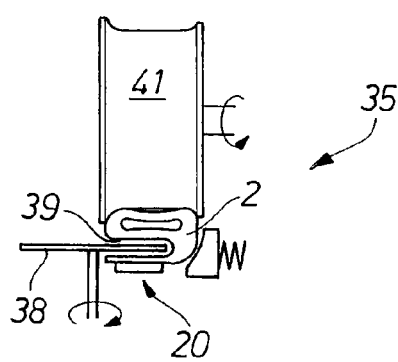
Figure 4:
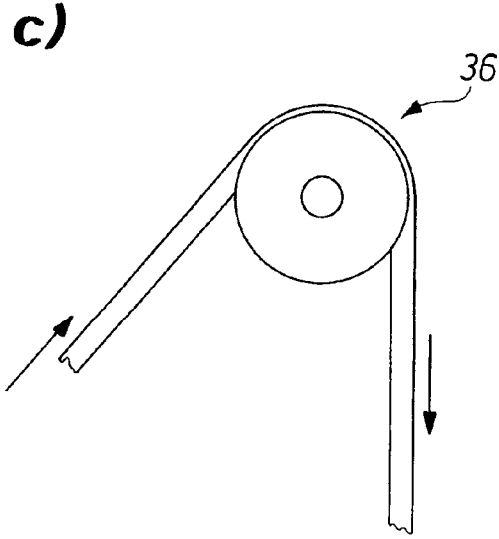
Figure 4:
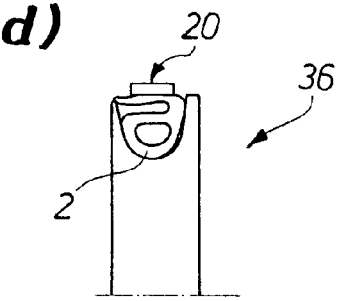
Figure 4:
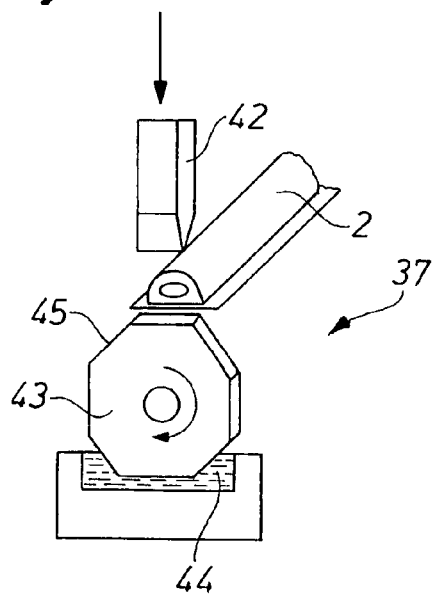

FIG. 4 shows various drive and guide means which satisfy this requirement. FIGS. 4a and 4b show a bottom view and a cross-sectional diagram of a frictionless profile feeder 35, which can be used in place of the support belt 27 and the corresponding rollers. FIG. 4c shows a side view of a guide pulley downstream of the assembly unit 9, i.e., downstream with respect to the direction of movement of the sealing profile. FIG. 4d shows a partial cross section of the guide pulley according to 4c. FIG. 4e, finally, shows a cutting device 37 located in the area of the press roller 4, by means of which the sealing profile attached to the vehicle door 3 is cut off straight across at the end of the application process.

The frictionless profile feeder 35 for a door sealing profile according to FIG. 3 consists essentially of two co-rotating disks, which engage in the intermediate space between the hollow profile 18 and the lip 19 of the sealing profile 2, as can be seen especially clearly in the cross-sectional diagram of FIG. 4b. Because the adhesive strip 20 is on the outward-facing surface of the lip 19, the second adhesive layer 33 does not come in contact with the rotating disks 38. To prevent the rotating disks 38a, 38b from slipping laterally out of the intermediate space 39, the sealing profile 2 is guided laterally by a guide element 40, which presses the seal toward the rotating disks under the action of springs bearing on the guide element 40. A drive roll 41, which pushes the sealing profile 2 in the direction of movement 11, rolls along the top side of the hollow profile 18.

The guide pulley 36 shown in FIGS. 4c and 4d guides the sealing profile 2 in such a way that the adhesive strip 20 faces outward, whereas the sealing profile 2, with its hollow profile 18, rests in the groove 42 passing around the guide pulley.

The cutting device 37 shown schematically in FIG. 4e consists of a cutting knife 42, a counterknife 43, which can turn around an axis of rotation, and an immersion bath 44 containing an anti-adhesive. The contact of the counterknife 43 with the second adhesive layer 33, as the sealing profile 2 on which the adhesive strip 20 is adhering is being cut off, causes no problem, because, after every cutting operation, the counterknife 43 is rotated by a certain amount, so that the various effective cutting edges 45 of the counterknife dip one after the other into the anti-adhesive present in the immersion bath 44. This prevents the cutting knife and the counterknife from becoming contaminated with residues of adhesive. Teflon or a plasma coating can be considered suitable as nonstick materials.

What is claimed is:

1. A method for attaching a sealing profile to a vehicle body part, the method comprising the following serial steps:
    pulling the sealing profile from a storage unit;
    passing the sealing profile through a first buffer which compensates for differences between incoming and outgoing speeds of the sealing profile;
    attaching, in an assembly unit, an adhesive strip to the sealing profile continuously after the sealing profile exits the first buffer, the adhesive strip having an adhesive layer;
    passing the sealing profile with the attached adhesive strip through a second buffer which compensates for differences between incoming and outgoing speeds of the sealing profile; and
    attaching, in an application unit, the sealing profile to the vehicle body part by rolling the adhesive layer onto the vehicle body part along a line provided for attaching the sealing profile,
    wherein the sealing profile runs from the storage unit to the application unit in one continuous run, whereby both the attaching of the adhesive strip to the sealing profile and the attaching of the sealing profile to a vehicle part occur in the one continuous run of the sealing profile.

2. The method of claim 1 wherein the adhesive strip has opposing first and second adhesive layers, the second adhesive layer being rolled onto the vehicle body part, the attaching of the adhesive strip to the sealing profile comprising:
   pulling the adhesive strip from a storage unit; and
   rolling the first adhesive layer against the sealing profile.

3. The method of claim 2 further comprising, after pulling the adhesive strip from a storage unit and before rolling the first adhesive layer against the sealing profile, passing the adhesive strip through a buffer which compensates for differences in incoming and outgoing speeds of the adhesive strip.

4. The method of claim 3 wherein the first adhesive layer comprises a heat activated adhesive, the method further comprising, after passing the adhesive strip through a buffer, heating the first adhesive layer.

5. The method of claim 1 further comprising, after attaching the adhesive strip to the sealing profile, guiding the sealing profile by means of at least one of drive elements and guide elements which do not contact the second adhesive layer.

6. An apparatus for attaching a sealing profile to a vehicle body part, the apparatus comprising:
   a storage unit for storing the sealing profile;
   means for pulling the sealing profile from the storage unit in a downstream direction;
   a first buffer downstream of the storage unit, the first buffer compensating for differences between incoming and outgoing speeds of the sealing profile;
   an assembly unit for attaching an adhesive strip to the sealing profile downstream of the first buffer;
   a second buffer downstream of the assembly unit, the second buffer compensating for differences between incoming and outgoing speeds of the sealing profile; and
   an application unit for attaching the sealing profile to the vehicle body part comprising press rollers to press the sealing profile continuously along a surface of the vehicle body parts following a predefined installation line,
   wherein the apparatus is arranged so that the sealing profile runs from the storage unit, through the first buffer, the assembly unit, and the second buffer, to the application unit in one continuous run, whereby both the attaching of the adhesive strip to the sealing profile and the attaching of the sealing profile to a vehicle part occur in the one continuous run of the sealing profile.

7. The apparatus of claim 6 wherein the assembly unit comprises:
   a storage unit for the adhesive strip, the adhesive strip having a first adhesive layer;
   means for pulling the adhesive strip from the storage unit; and
   a press roller which presses the first adhesive layer onto the sealing profile.

8. The apparatus of claim 7 wherein the storage unit comprises two spools from which matching adhesive strips can be pulled in alternation, the fabrication unit further comprising:
   an adhesive strip connector for connecting the matching adhesive strips from respective said spools; and
   a buffer installed between the adhesive strip connector and the press roller, the buffer compensating for differences between incoming and outgoing speeds of the adhesive strip.

9. The apparatus of claim 7 further comprising heating means for heating the first adhesive layer before the first adhesive layer is pressed onto the sealing profile.

10. The apparatus of claim 9 wherein the heating means is arranged to heat the first adhesive layer as the adhesive strip moves around the press roller.

11. The apparatus of claim 7 wherein the press roller is mounted in a position which is adjustable with respect to the sealing profile.

12. The apparatus of claim 6 wherein each of said buffers comprises:
   a plurality of pulleys over which the sealing profile is guided, the pulleys being separated by a distance; and
   an adjusting drive for changing the distance between the pulleys.

13. The apparatus of claim 6 wherein the application unit is mounted on the arm of a robot.

14. The apparatus of claim 6 wherein the application unit comprises a device for cutting the sealing profile.

15. The apparatus of claim 6 wherein the first buffer, the assembly unit, and the second buffer are located in a climate-controlled chamber.

16. The apparatus of claim 8 wherein the buffer installed between the adhesive strip connector and the press roller comprises:
   a plurality of pulleys over which the adhesive strip is guided, the pulleys being separated by a distance; and
   an adjusting drive for changing the distance between the pulleys.

* * * * *